Patented Feb. 6, 1940

2,189,124

UNITED STATES PATENT OFFICE 2,189,124

MECHANICAL SEPARATION OF MIXTURES OF SUBSTANCES, PARTICULARLY COARSE-GRAINED MINERAL MIXTURES

Ernst Bierbrauer, Leoben, Austria, assignor to Metallgesellschaft A. G., Frankfort-on-the-Main, Germany No Drawing. Application October 16, 1936, Serial No. 106,057. In Germany October 18, 1935

6 Claims. (Cl. 209—49)

This invention relates to a process of mechanically separating mixtures of substances, particularly coarse-grained mineral mixtures, which is based on an entirely novel principle.

The only methods known at present for separating coarse-grained mineral mixtures substantially rely for the separation of the substances on the utilization of existing differences in specific gravity, magnetizability or optical properties. The applicability of the corresponding coarse grain preparing or dressing processes, such as settling operation, magnetic separation and hand sorting, and the mechanical separability of substance mixtures in coarse form depend therefore on the existence of corresponding differences in the physical properties mentioned of the various components of the mixtures. It will be apparent that in this way the preparation of coarse-grained mixtures the constituents of which do not disclose such separating properties, as frequently happens for instance in case of non-metallic useful minerals, is rendered extremely difficult if not impossible.

The process according to the invention eliminates this difficulty by utilizing for separation properties of the constituents of the mixtures, which can be easily artificially and differently influenced, namely, the interfacial properties. These properties make it possible to separate the coarse-grained constituents by artificially differentiating them and then separating them from one another by means of their different adhesive power relative to suitable solidifying or hardening masses.

This new process of preparation and dressing fundamentally differs from other methods based in the widest sense of the word on the principle of adhesion, as applied for instance to flotation or to the contact process with its so-called fat centers, wherein the materials are worked in fine-grained condition in the form of an aqueous flotation or slime with respect to the workable grain size. Owing to the measures and adhesive means to be applied according to the invention, much greater adhesive power is available for binding the grains whose size is upwardly unlimited within the scope of practical requirements.

To illustrate the fundamental difference between the new process and the above-mentioned flotation and the contact process the principles of these known processes will now be discussed in detail.

Flotation is also based on an artificial differentiation of the adhesiveness of the components of a mixture of minerals for causing a tendency of the various constituents of a mixture to adhere to a different degree to the air bubbles rising in the flotation slime. The principal advantage afforded by flotation compared with all other known methods of preparation consists in the absolute independence from originally existing differences in the physical properties of the substances to be separated and thus in the general applicability of this process of preparation to the most diversified mineral mixtures. Flotation is used also for dressing ores the individual constituents of which for want of corresponding differences for instance in specific gravity or magnetizability cannot be separated by the known gravity methods or by means of magnetic separation. Furthermore, due to the possibility of artificially influencing the separating properties, flotation attains a degree of efficiency in separation generally superior in results to that achieved by all other methods of this class.

The application of flotation, on account of its working principle, is possible, however, only if the grain mixture to be separated possesses sufficient fineness, with an upper limit of approximately 0.5 mm. diameter of grain. This of course involves a disadvantage with respect to ores which are already treated and have a larger granulation and which for want of corresponding differences in the physical behavior of their individual components cannot be dressed with a sufficient degree of separating efficiency by means of one of the known dressing methods for coarse-grained material, such as settling classification, magnetic separation, etc., and which can therefore be separated only by flotative procedure. In such instances, fine grinding, filtering and lumping if necessary involve additional expenditures which are not required by the nature of intergrowth of the mixture to be separated but which are exclusively due to the process applied.

Another separation process based on the principle of adhesion is the so-called contact method according to which the ores to be separated are guided in finely divided condition and mixed with water to form a pulp over supports coated with a liquid adhesion substance of organic origin. Minerals, such as diamond, graphite, precious metals and heavy metal sulfides that are carbophile in the natural state, adhere to this liquid adhesion mass, whereas the vein minerals, quartz, etc. are washed away with the pulp water owing to their natural hydrophobic behavior. It has been attempted to improve the separating efficiency of this method by means of particularly selectively acting adhesion supports like tar, asphalt, etc., which by the addition of oils, fatty acids, petroleum and similar solvents or diluents are converted into the syrup consistency required for this method. It has further been recommended to employ inorganic additions to the organic adhesion mass, preferably water glass. The addition is intended to impart to the adhesion mass greater repelling power relative to the gangue grains, which is also to be effected by the direct addition of water glass to the pulp. However, this partial influencing of the gangue does not render the contact method independent of natural differences in the adhesive capacity of the kinds of substances to be separated with respect to the organic adhesion masses used, and the method is thus similarly limited relative to the grain sizes treated under it as the old so-called oil flotation. Only the modern flotation method has eliminated this limitation and is therefore at present the only process which, owing to general differentiation of the separating properties, is almost completely independent of originally existing differences in physical behavior. The only defect inherent in the process is the impossibility of flotatively separating coarse-grained substances. This restriction to fine grain dressing extends also to the contact method, though compared with flotation it does not require fine grinding to the same degree. All the same, the adhesive forces active in this process and also relatively weakened still demand fine grinding of the material to be separated to a grain diameter of approximately 0.5 mm.

Compared with the processes described, the invention provides a process by means of which mechanical separation of coarse-grained mixtures of materials according to their nature independently of the presence of natural differences in the physical behavior of the various kinds of substances is made possible. The principle of the novel separation method consists in utilizing differences in the wetting capacity of the substances, artificially produced as in flotation, for selectively causing the substances according to their different wetting capacity to adhere to hardening hydrophile or hydrophobe substances and then separating them corresponding to their different adhesive strength. The possibility of artificially differentiating adhesive power imparts to this process the same general applicability by which flotation is distinguished, whilst the further possibility, not provided by flotation, of increasing adhesive forces at will renders the new process suitable for separating, above all, coarse-grained mixtures having a grain diameter of up to 100 mm. and more. It is inherent in the working principle of this new process that the attainable separating efficiency increases with the grain size of the mixtures to be separated, the lower limit of practical applicability being a grain diameter of approximately 5 to 10 mm.

Artificial influencing of the adhesive capacity of the various kinds of substances relative to hydrophile or hydrophobe hardening or solidifying substances can be effected in principle by treating the mixtures with aqueous solutions or emulsions of chemical reagents which in flotation practice are suited as "collectors" for differentiating the flotative capacity of two and more mixtures and which in modern flotation generally comprise water soluble organic substances of known molecular structure. During this primary treatment by the use of correspondingly chosen reagents, for instance in a two-component mixture one substance with hydrophobe and the other with hydrophile character, i. e., after removal of the grain mixture from the pretreating solution and after rinsing with pure water, the hydrophile substance will be covered with an almost closed water envelope while the hydrophobe substance will be practically non-wetted owing to an organic adsorption cover. When this grain mixture is then brought into contact with ice or a thin layer of freezing water or with a substance cooled below the freezing point of water and capable of being wetted, for instance by being placed on supports of this kind, the wetted substances with their water cover will firmly freeze onto these supports, and the non-wetted grains will adhere not at all or only so loosely that a slight mechanical attack, such as inclining the support somewhat or turning it or low heating, suffices for removing this component from the support and thus separating it from the other firmly adhering component. The adhesion procedure is inverted if, according to the invention, instead of ice or of the other substances mentioned a solidifying or hardening water repelling substance as used as adhesion mass, for instance asphalt, tar, natural or synthetic resins and other organic substances. When the grain mixture treated in the manner described is brought into contact with such substances by being placed for instance upon a support provided with such an organic mass softened by heat supply, the grains artificially rendered incapable of being wetted will firmly adhere while the wetted grains cannot stick owing to the covering water film. To attain this difference only such hydrophobe adhesion masses can be used whose softening point is below the boiling point of water. On the other hand, these substances are to be firm at normal room temperature, or slight cooling must suffice to convert them from a softened to a firmly solid state. On such supports the adhesive strength of the substance rendered hydrophobe is so great that even grains having a size up to 100 mm. and over after solidification of the mass will still be held if the support is turned over and the entire weight of the grains counteracts the intensity of adhesion. The adhering grains are detached as much as possible while the organic mass is in a solidified or almost solidified state, as in this manner the support will not be damaged and the substances adhering thereto will not be soiled with adhesion mass after removal. A particularly favorable effect of the pretreatment of the grains is that the reagents, such as fatty acids or their water soluble salts, xanthates, alcohol sulfonates, etc., used for influencing adhesiveness coat the substance that cannot be wetted with an organic cover disclosing a marked affinity to the hydrophobe adhesion masses mentioned. Interlinking with the adhesion mass is thus insured even if the mass is firm or only very slightly softened. This process is favored still more in case of very large grains by the correspondingly great contact pressure. Generally, a state of softening at which the adhesion mass can just be scratched with a finger nail will be sufficient. The coarser and thus the heavier the adhering kind of grain the less softening is required, which can be easily attained by proper selection of the adhesion mass and by maintaining certain temperatures. In view of the importance of contact pressure it is advisable previously to classify the material to be separated and to separately subject each class of grain to the adhesion process. This applies to both the last-mentioned method and to the freezing on process.

For carrying out the various forms of application of the new process different possibilities exist of course for which below merely the chief features are outlined.

The freezing on process generally requires a preliminary treatment, separated from the adhesion process proper, possibly by immersing the grain mixture to be separated in the liquid differentiating wetting capacity and subsequent rinsing with water. Separate pretreatment can also be applied to the second procedure which in this case, however, can be simplified by covering the adhesion support itself with the liquid differentiating the wetting capacity of the mixture, the liquid being preferably heated to a temperature corresponding to the desired degree of softening of the adhesion mass. Detachment of the grains from their support can be effected by mechanical action or heating. The support may be plane, grooved or have another profile. An uneven support, such as a wire cloth, is particularly suitable in case of grains having a pronounced flat form.

The mode of application and the separating results of the process described will now be illustrated with reference to experiments that have been practically carried out.

The experiments chosen as examples deal with a natural mixture of phosphorite nodules and dead siliceous rubble of approximately 30 mm. to 60 mm. grain diameter. This coarse-grained mixture was chosen, because it brings out the advantages of the process in a particularly impressive manner for the reason that for want of corresponding differences in the physical properties of its two substances it could not be mechanically separated by one of the known coarse grain dressing methods. To provide for the artificial production of the selective adhesion capacity according to the invention the mixture mentioned was first immersed in an aqueous solution of sodium palmitate, i. e., treated with a reagent known to influence also the floatability of phosphorite and other alkaline-earth minerals. After having been rinsed with water a portion of this specimen was placed on a support of ice and another portion on an asphalt support positioned in warm water. In the first case the wetted gravelly constituents froze onto the ice while the phosphorite nodules that had not been wetted due to the pretreatment could be easily removed by turning the ice support. When the asphalt support was used, however, the non-wetted phosphorite grains stuck and the rubble could be removed by turning the support. In both instances a pure phosphorite concentrate with a yield of more than 90% was obtained with the aid of the various separation processes. The starting material comprised approximately equal parts of phosphorite and siliceous gangue. When control tests were made and the same mixture brought upon the ice support without adsorptive pretreatment, only after rinsing with water, both components froze on in the same manner. When placed on the organic support, both substances equally failed to disclose adhesion.

The separating experiments were extended to other mineral mixtures with the result that during the conduction of experiments as described other alkaline-earth minerals like calcspar, dolomite, magnesite, heavy spar, etc., could also be separated in the same manner from siliceous gangue. Furthermore, heavy metal minerals, such as siderite, cerussite, pyrite, galena, copper pyrites and zinc blende, were found to be separable also in grain sizes at which all other mechanical coarse grain dressing methods failed. In case of sulfidic metallic minerals the reagents known from sulfide flotation proved to be advantageous for preliminary treatment. It was further noted that above all in case of the finer granulations of approximately 10 mm. grain diameter, which involve greater difficulties in separation, the separating efficiency can be increased by briefly drying the grain mixtures after the adsorptive treatment and washing with water and then immersing them again in pure water.

I claim:

1. In the process of surface concentration of mineral substances of at least 5 mm. diameter having hydrophile and hydrophobe constituents, the steps comprising, wetting said mineral substances, raising the temperature of a normally solid organic water repelling adhesion mass capable of becoming plastic at temperatures below the boiling point of water until it becomes plastic, contacting said wetted mineral substances with a surface of said adhesion mass while plastic, lowering the temperature of said adhesion mass below the temperature of plasticity to cause its solidification, and causing the non-adhering substances to drop off from said adhesion mass, and thereafter detaching the adhering substances from said solidified adhesion mass.

2. In the process of surface concentration defined in claim 1, the step of artificially producing differentiation in the wetting capacity of the mineral substances prior to the step of wetting said mineral substances.

3. In the surface concentration of coarse-grained mineral substances of at least 5 mm. diameter, the steps comprising in combination, first treating said mineral substances with water soluble organic liquids selected from the group consisting of the water soluble salts of fatty acids, xanthates and alcohol sulfonates, and thereafter wetting with water, raising the temperature of a normally solid organic hydrophobe adhesion mass capable of becoming plastic at temperatures below the boiling point of water until it becomes plastic, contacting a surface of said plastic adhesion mass with said wetted mineral substances, cooling said adhesion mass to substantially solid state, causing the non-adhering substances to drop off from said adhesion mass, and thereafter detaching the adhering substances from said adhesion mass.

4. In the surface concentration of coarse-grained mineral substances, the steps comprising in combination, first treating said mineral substances with water soluble organic liquids selected from the group consisting of soluble salts of fatty acids, xanthates and alcohol sulfonates, and thereafter wetting with water, briefly drying said mineral substances and immersing them again in water, raising the temperature of a normally solid organic water repelling adhesion mass capable of becoming plastic at temperatures below the boiling point of water until it becomes plastic, contacting said adhesion mass while plastic with said wetted mineral substances, cooling said adhesion mass to substantial solid state, causing the non-adhering mineral substances to drop off from said adhesion mass, and thereafter detaching the adhering mineral substances from said adhesion mass.

5. In the surface concentration of coarse-grained mineral substances, the steps comprising in combination, raising the temperature of a normally solid organic hydrophobic adhesion mass capable of becoming plastic at temperatures below the boiling point of water until it becomes plastic, wetting said adhesion mass, when plastic, with a solution of a water soluble salt of a fatty acid, contacting a surface of said adhesion mass when plastic and wetted with said solution with said mineral substances, cooling said adhesion mass to substantially solid state, causing the non-adhering mineral substances to drop off from said adhesion mass, and thereafter detaching from said adhesion mass the adhering mineral substances.

6. In a process of surface concentration of mineral substances of at least 5 mm. diameter having hydrophile and hydrophobe constituents, the steps comprising wetting said mineral substances, softening a solid organic water-repellant adhesion mass, capable of becoming plastic and capable in solid condition of adhering said hydrophobe constituents only, until it becomes plastic, contacting said wetted mineral substances with a surface of said adhesion mass while plastic, solidifying said adhesion mass to cause the non-adhering substances to drop off from said adhesion mass, and thereafter detaching the adhering substances from said solidified adhesion mass.

ERNST BIERBRAUER.